Nov. 19, 1963     A. R. GETZIN     3,111,489

UNIT FILTER ASSEMBLY

Filed June 28, 1961

*INVENTOR.*
ALLAN R. GETZIN

BY

*Ralph B. Brick*
ATTORNEY 3,111,489
UNIT FILTER ASSEMBLY
Allan R. Getzin, Jeffersontown, Ky., assignor to American Air Filter Company, Inc., Louisville, Ky., a corporation of Delaware
Filed June 28, 1961, Ser. No. 120,243
2 Claims. (Cl. 210—232)

The present invention relates to a filter assembly and more particularly to an improved filter assembly arrangement which includes a unit filter medium supporting frame having open upstream and downstream faces to permit fluid flow through a filter medium member which it supports.

In accordance with the present invention, a novel filter medium supporting frame is provided which can be economically and efficiently mass produced, which can be readily assembled for insertion and removal of the filter medium member which it supports and which can provide ready liquid drainage whenever required.

Various other features of the present invention will become obvious to one skilled in the art upon reading the disclosure set forth hereinafter.

More particularly the present invention provides a unit filter assembly comprising a pair of substantially identical filter frame halves, each of the halves including a perimetric base wall means and side wall means extending at right angles from the perimeter of the base wall means, spaced slot means in each of the side wall means to separate each of the side wall means into even numbered first and second sets of alternating side wall portions, with the side wall portions within each set being substantially equal in length to each other and with the side wall portions of one set exceeding in length the side wall portions of the other set by at least substantially twice the side wall portion thickness of such other set whereby the frame halves can be interlocked with side wall portions of the first set of one frame half facing the side wall portions of the second set of the other frame half so as to be in fixed lateral position with respect to each other with each frame half presenting at least one pair of side wall gripping portions for ready withdrawal and disconnect from the other frame half with which it is interlocked, the perimetric base wall means of the frame halves defining opposed openings to provide open upstream and downstream faces to permit fluid flow therethrough, and filter medium means disposed within the interlocked frame halves between the upstream and downstream faces.

It is to be understood that various changes can be made by one skilled in the art in the arrangement, form and construction of the apparatus disclosed herein without departing from the scope or spirit of the present invention.

Figure 1:
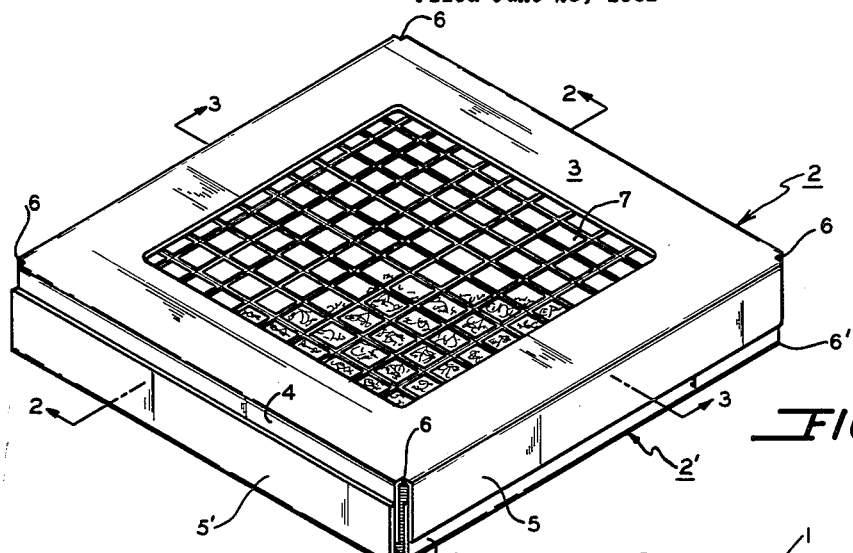
Figure 2:
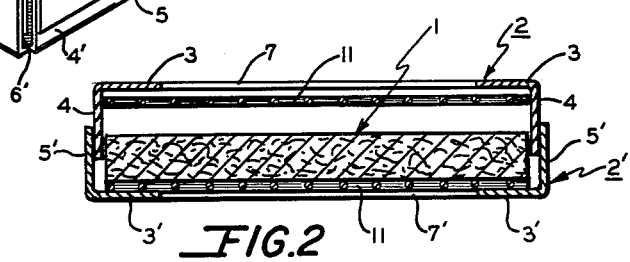
Figure 5:
Figure 3:
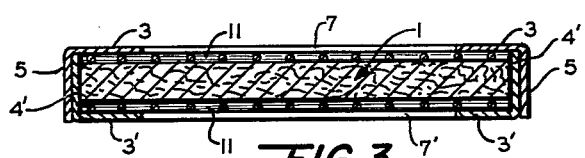
Figure 4:
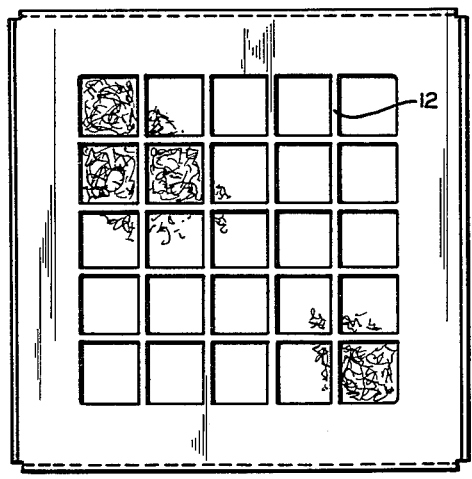

Referring to the drawing:
FIGURE 1 is an isometric view of a unit filter assembly which incorporates features of the present invention;
FIGURE 2 is a reduced sectional view taken along line 2—2 of FIGURE 1;
FIGURE 3 is a reduced sectional view taken along line 3—3 of FIGURE 1;
FIGURE 4 is a plan view of a modified frame half of the present invention; and,
FIGURE 5 is a reduced perspective view, disclosing the ready manner of assembly and disassembly of a unit filter arrangement incorporating features of the present invention.

As can be seen in FIGURES 1–3 of the drawing, the unit filter assembly of the present invention broadly comprises an appropriately sized filter medium member 1 interposed between a pair of interlocked filter frame halves 2, 2', which advantageously can be fabricated from a suitable flexible material such as thin gauge aluminum. The frame halves are identical in size and shape and thus are interchangeable to facilitate mass production and assembly. Although, advantageously, the frame halves disclosed are of four sided shape and of hand size, it is to be understood that the present invention is not limited to this particular size and shape frame but that other sizes and other shapes which include side wall portions of even number can be utilized.

Frame halves 2, 2' in the embodiment of the invention set forth herein each includes a perimetric, rectangularly shaped base wall 3, 3', respectively, with each base wall 3 and 3' having two sets of side wall portions 4, 5 and 4', 5', respectively, all of substantially uniform thickness, extending at right angles from the outer perimeters thereof. It is to be noted that there are an even number of side wall portions in each side wall set with the side wall portions of sets 4 and 4' alternating with side wall portions of sets 5 and 5', respectively and with corner slots 6, 6' serving to separate adjacent side wall portions in frame halves 2 and 2', respectively. It further is to be noted that the length of the side wall portions of sets 4 and 4' exceed the length of the side wall portions of sets 5 and 5', respectively, by a distance of approximately twice the side wall portions thickness. With such an arrangement, it is possible to interlock frame halves 2, 2' in such a manner that they cannot be shifted laterally with respect to each other, i.e., in a plane parallel to the planes of base walls 3, 3'. This interlocking can be accomplished by orienting the frame halves 2, 2' with respect to each other so that side wall portions of sets 4 and 4' in each frame half respectively face the side wall portions of sets 5 and 5' in the respectively opposite frame half. Since the side wall portions of sets 4 and 4' are of greater length than the side wall portions of sets 5 and 5', the side wall portions of sets 5 and 5' in frame halves 2 and 2', respectively, fall along the outside faces of the side wall portions of sets 4' and 4, respectively, to provide a pair of opposed gripping surfaces available on each frame half.

To provide open upstream and downstream faces to permit fluid flow therethrough, perimetric base walls 3, 3' of frame halves 2, 2' each define an opposed opening 7, 7', respectively. Prior to assembly of filter frame halves 2, 2', a suitable filter medium member 1 can be inserted between the frame halves. It is to be understood that this filter medium, which can be any one of a number of well known filter mediums (i.e., fiber glass), is sized to nest in snug engagement between frame halves. Suitable filter medium retaining members 11, which advantageously can be of expanded metal or perforated hardware cloth, are also sized to correspond with the filter frame halves and can be inserted between the frame halves along either face of the filter medium member 1 to further retain the filter medium member 1 in the assembled frame.

It is to be noted that the aforedescribed corner slots 6, 6' allow flexing of the side wall portions whenever necessary for close facing of the side wall portions upon frame halves interlocking and, in addition, these slots can be dimensioned to serve effectively as drainage means for any excess liquids which might be on or collect upon filter medium member 1. It further is to be noted that there can be provided in place of separate filter medium retaining members 11, as disclosed in FIGURES 1–3 of the drawing, suitable filter medium retaining grid structure 12 integral with each frame half in order to reduce the cost of manufacture and to further increase the efficiency of filter unit assembly and disassembly (FIGURE 4).

Referring to FIGURE 5 of the drawing, it can be seen that a small rectangular hand size unit which incorporates the features of the present invention can be readily assembled and disassembled without use of any tools whatsoever. In assembly, it only is necessary to hold a frame half of the present invention in each hand and, with an appropriately sized filter medium member disposed therebetween, the frame halves in each hand can be brought into interlocking engagement with each other so that the shorter side wall portions of each frame half face against the outer faces of the longer side wall portions of the other frame half. With this interlocking arrangement, the outer short side wall portions of the frame halves serve as ready gripping surfaces when the interlocked frame halves are to be pulled apart for insertion of a fresh filter medium member therebetween.

The invention claimed is:

1. A unit filter assembly comprising a pair of substantially identical filter frame halves, each of said halves including a perimetric base wall means and side wall means extending at right angles from the perimeter of said base wall means, spaced slot means in each of said side wall means to separate each of said side wall means into even numbered first and second sets of alternating side wall portions with the side wall portions within each set being substantially equal in length to each other and with the side wall portions of one set exceeding in length the side wall portions of the other set by approximately twice the side wall portion thickness of such other set whereby said frame halves can be interlocked with side wall portions of the first set of one frame half facing the side wall portions of the second set of the other frame half so as to be in fixed lateral position with respect to each other with each frame half presenting at least one pair of side wall gripping portions for ready withdrawal and disconnect from the other frame half with which it is interlocked, said perimetric base wall means of said frame halves defining opposed openings to provide open upstream and downstream faces to permit fluid flow therethrough, and filter medium means disposed within said interlocked frame halves between said upstream and downstream faces.

2. A unit filter assembly comprising a pair of substantially identical filter frame halves, each of said halves including a rectangular perimetric base wall and a rectangular side wall extending at right angles from the perimeter of said base wall, spaced corner slots in each of said side walls to separate each of said side walls into first and second sets of opposed side wall portions with the opposed side wall portions of each set being substantially equal to each other in length and with the side wall portions of one set exceeding in length the side wall portions of the other set by approximately twice the side wall portion thickness of such other set whereby said frame halves can be interlocked with side wall portions of the first set of one frame half facing the side wall portions of the second set of the other frame half so as to be in fixed lateral position with respect to each other with each frame half presenting a pair of opposed side wall gripping portions for ready withdrawal and disconnect from the other frame half with which it is interlocked, said perimetric base wall of said frame halves defining opposed openings to provide open upstream and downstream faces to permit fluid flow therethrough, and filter medium means disposed within said interlocked frame halves between said upstream and downstream faces.

References Cited in the file of this patent

UNITED STATES PATENTS

| | | |
|---|---|---|
| 2,160,003 | Slayter et al. | May 30, 1939 |
| 2,581,105 | Hunsworth | Jan. 1, 1952 |